No. 709,383. Patented Sept. 16, 1902.
E. WILLCOX.
ASH SIFTER.
(Application filed Sept. 11, 1901.)
(No Model.)
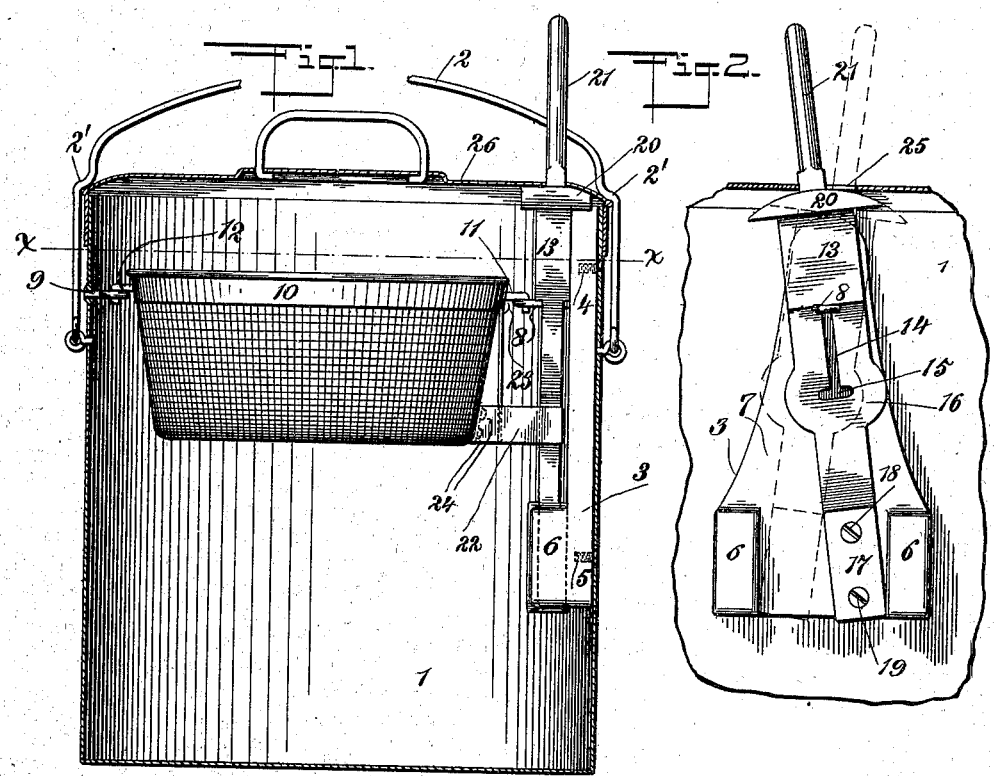
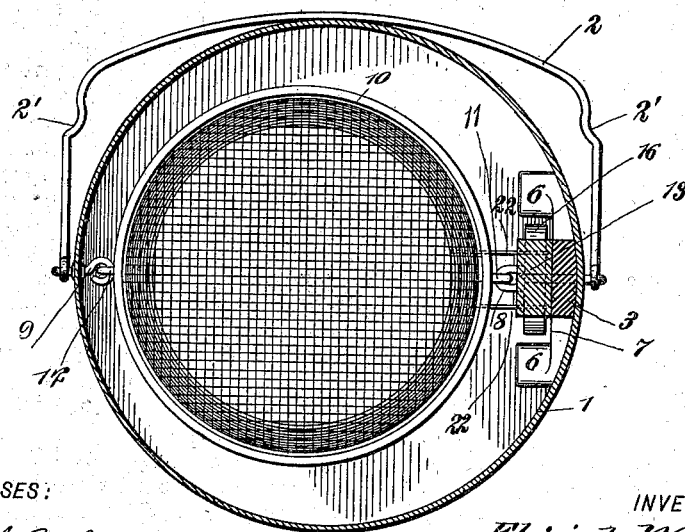
WITNESSES:
A. Russell Bond.
Walton Harrison.
INVENTOR
Elijah Willcox
BY Munn & Co
ATTORNEYS

UNITED STATES PATENT OFFICE.

ELIJAH WILLCOX, OF YONKERS, NEW YORK.

ASH-SIFTER.

SPECIFICATION forming part of Letters Patent No. 709,383, dated September 16, 1902.

Application filed September 11, 1901. Serial No. 75,102. (No model.)

*To all whom it may concern:*

Be it known that I, ELIJAH WILLCOX, a citizen of the United States, and a resident of Yonkers, in the county of Westchester and State of New York, have invented a new and Improved Ash-Sifter, of which the following is a full, clear, and exact description.

My invention relates to ash-sifters. They can be made upon a small scale, suitable for ordinary or household use, or upon a larger scale, suitable for use in immense buildings.

Reference is to be had to the accompanying drawings, forming a part of this specification, in which similar characters of reference indicate corresponding parts in all the figures.

Figure 1 is a vertical section of my device. Fig. 2 is a fragmentary view showing certain parts in elevation, and Fig. 3 is a horizontal section on the line $x\ x$ of Fig. 1.

The outer vessel 1 has preferably the form of a bucket, which may be of any desired size and is manipulated by means of the handle 2 in the usual manner. A bearing-block 3 is secured inside of this bucket by means of screws 4 5 and is provided with lugs 6 6 and with a flat face 7. An eye 8 is secured in this block, being preferably bent so as to present square shoulders adjacent to the face of the block, as shown in Fig. 3. Upon this eye 8 and a somewhat-similar eye 9 is mounted a sieve 10, which is provided with lugs 11 and 12 for the purpose. A lever 13, provided with a cross-shaped slot consisting of a vertical aperture 14 and a horizontal aperture 15 in the broad portion 16, is also mounted upon the stem of the eye 8, so as to be readily removable therefrom by merely raising the lever upward until the eye can pass through the bottom 15 of the slot. The lever is oscillated, as indicated by full and dotted lines in Fig. 2. At the lower end of the lever is a noise-deadening block 17, made, preferably, of hard wood and secured firmly upon the lever by means of screws 18 19, so as to be readily removed therefrom. This block is to avoid undue noise and also to prevent excessive jarring of the mechanism. At the top of the lever is an arc-shaped shield 20, which prevents the escape of ashes and dust from the aperture 25 in the top of the vessel 1 when the device is in operation. A handle 21 projects through the opening 25 and is used for actuating the lever. A shoulder formed by the upper terminal of the slot 14 in the lever normally rests upon the stem of the eye 8.

A metallic shoe 22 is removably secured upon the sieve 10 by means of bolts 23 24. This shoe normally straddles the lever, as shown in Fig. 3, said shoe being also shown in engagement with the lever by Fig. 1.

The operation of my device is as follows: Supposing that the apparatus is not assembled, I remove the cover 26 of the bucket and place the lever in position by passing the slot 15 over the eye 8, so that the slot 14 will engage the stem of the eye. I next place the sieve 10 in position so that the lugs 11 and 12 will rest in the eyes 8 and 9, so that said sieve is free to swing. I now place the cover in position so that the handle 21 projects through the aperture 25 and the shield 20 practically closes the opening 25. Upon actuating the handle 21 of the lever the stem of the eye 8 acts as a fulcrum and the lower end of the lever carrying block 17 is caused to swing with a pendulum-like motion. The lugs 6 6 act as stops, and thereby prevent motion of the lever from exceeding certain limits.

If the apparatus is hard to work or is to be operated by a weak person, the fulcrum-point of the lever is shifted by raising the lever a slight distance relatively to the stem of the eye; but this change in the position of the lever requires the bail 2 to be thrown over to one side and the cover 26 to be raised a distance corresponding to the lifting adjustment of said lever. By raising the lever upward a considerable purchase is acquired, and vice versa. When the lever is lowered the purchase is lost, but the swing of the sieve is somewhat greater. The ashes need not be sifted every day, but can be allowed to accumulate, if desired. When it is desired to empty the ashes, the operation is quite simple. The cover is removed, next the sieve is taken out, and, if desired, the lever is also removed. The ashes are then emptied out as they would be from any other vessel and the parts replaced.

The improved construction which I have invented is very simple and cheap, because it has comparatively few working parts, which are efficient in operation and are not liable to get out of order. It will be readily understood that when the containing vessel becomes worn out a new one can readily be substituted therefor, thus using the operating parts of the sifter in connection with different vessels.

The lid 26 is held securely down by the bends 2' 2' in the handle 2.

Having thus described my invention, I claim as new and desire to secure by Letters Patent—

1. An ash-sifter comprising a containing vessel, an oscillatory sieve mounted therein, a shoe movable with said sieve, and a lever shiftably mounted to change its fulcrum and having a slidable operative connection with said shoe.

2. An ash-sifter comprising a containing vessel, a rockable sieve mounted in said vessel, a lever for actuating said sieve, said lever being provided with a longitudinal slot which operatively engages with a fixed pivot, and the lever being longitudinally movable relative to said pivot for the purpose of shifting the fulcrum of said lever, and a slidable connection between the sieve and the lever, whereby the lever may be adjusted expeditiously in an endwise direction on the sieve.

3. An ash-sifter comprising a containing vessel, an oscillatory sieve mounted therein, a supporting-plate secured within said vessel and provided with spaced stops, a lever fulcrumed on said supporting device at a point above the stops thereof, a noise-deadening block carried by said lever and adapted to strike against either of said stops, and means for connecting said lever operatively with said sieve.

4. An ash-sifter, comprising a containing vessel provided with a lever-stud and with sieve-supports, an oscillatory sieve provided with hooks for engaging said supports, and a lever for actuating said sieve and provided with a cross-shaped slot for slidably engaging said lever-stud, whereby said lever is rendered readily detachable, and the fulcrum-point thereof is easily changed at will.

5. An ash-sifter comprising a containing vessel provided with a lever-stud and with sieve-supports, an oscillatory sieve having hooks which engage with said supports, a lever provided with a cross-shaped slot and adapted to slidably engage with said lever-stud, means connecting said lever and said sieve, and a bearing-plate on said vessel and provided with stops, the lower end of the lever being arranged to play between the stops.

In testimony whereof I have signed my name to this specification in the presence of two subscribing witnesses.

ELIJAH WILLCOX.

Witnesses:
 HARRY HEALY,
 NIAL W. OAKLEY.